Figures 3, 4, 5:
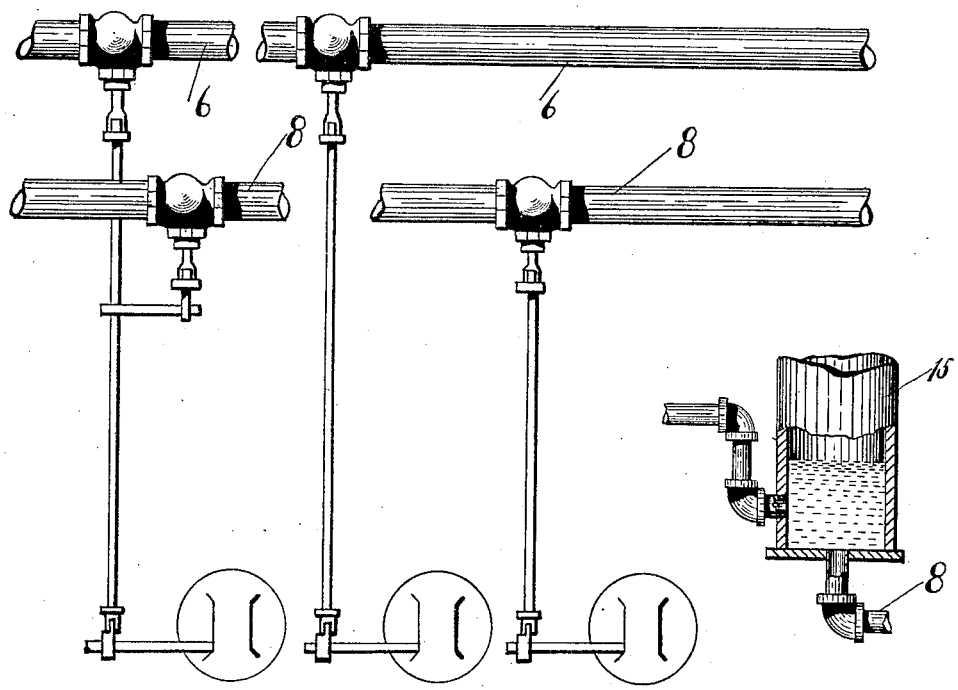

No. 876,357. PATENTED JAN. 14, 1908.
J. C. JONES.
FEED WATER HEATER AND PURIFIER.
APPLICATION FILED JULY 8, 1907.
2 SHEETS—SHEET 1.
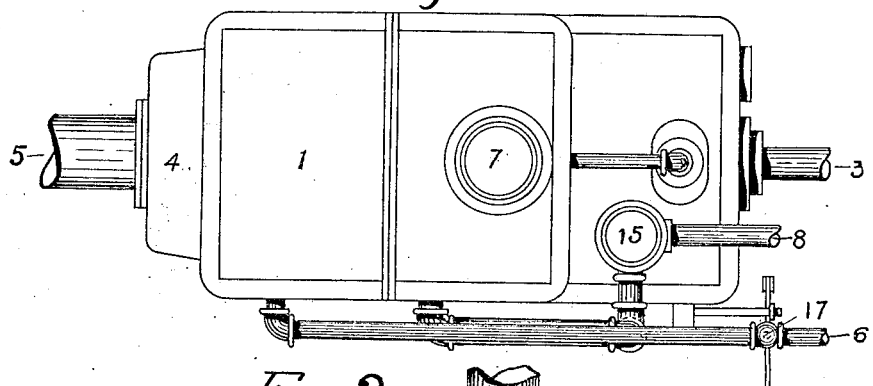
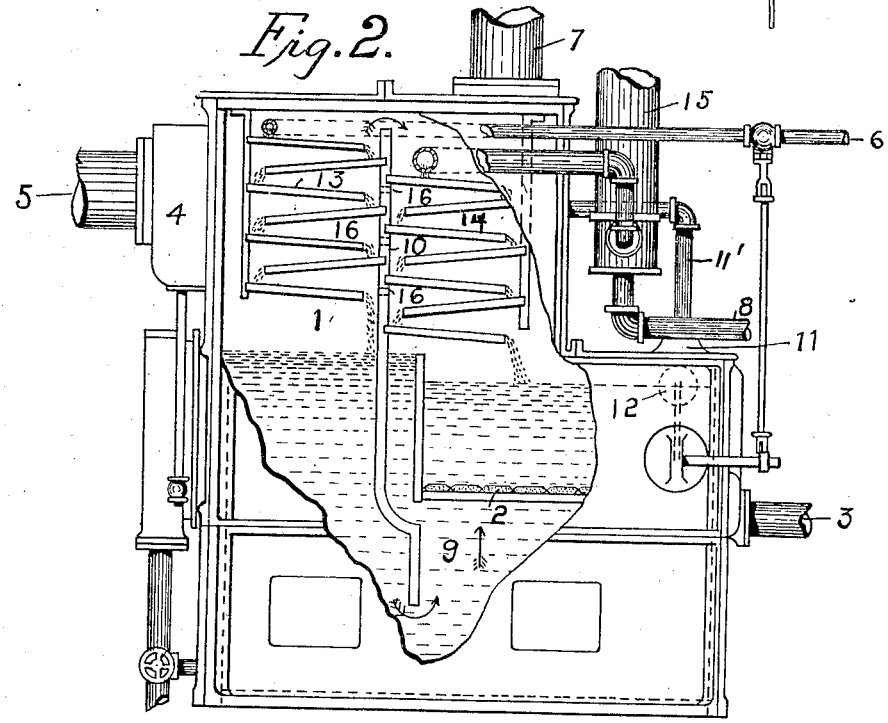

No. 876,357. PATENTED JAN. 14, 1908.
J. C. JONES.
FEED WATER HEATER AND PURIFIER.
APPLICATION FILED JULY 8, 1907.

2 SHEETS—SHEET 2.

UNITED STATES PATENT OFFICE.

JOHN CLIFFORD JONES, OF WYNNEWOOD, PENNSYLVANIA.

FEED-WATER HEATER AND PURIFIER.

No. 876,357.        Specification of Letters Patent.        Patented Jan. 14, 1908.

Application filed July 8, 1907. Serial No. 382,611.

*To all whom it may concern:*

Be it known that I, JOHN CLIFFORD JONES, a citizen of the United States, and resident of and whose post-office address is Wynnewood, in the county of Montgomery and State of Pennsylvania, have invented certain new and useful Improvements in Feed-Water Heaters and Purifiers, of which the following is a specification.

My invention relates to improvements in feed water heaters and purifiers, and especially to those where the water of condensation is taken from the condenser and used over again.

The objects of my invention are to provide an economical, convenient and effective device for re-heating the condensed water and such supplemental raw water as may be necessary to make up the amount required. I attain these objects by the device illustrated and described in the following specification and drawings in which like numerals of reference refer to like parts throughout the respective views.

Figure 1 is a top plan view of a combined heater, purifier and filter embodying my invention. Fig. 2 is an elevation thereof, showing a portion of the casing broken away and the interior parts chiefly in section. Figs. 3 and 4 are detail views showing float controlled valves in both raw water and condensed water supplies. Fig. 5 is a sectional view of the stand pipe showing the water seal connection.

Since the general structure of feed water heaters, etc., is well known in the art, I do not illustrate those features which are common in this device and which form no particular part of my improvement, and which have already been described, in various patents heretofore issued.

Referring in detail to Fig. 2, —1— is a heater; 2—a filter bed; 3—an outlet passage; 4—separator; 5—steam inlet; 6—inlet for raw water; 7—exhaust to the atmosphere; 8—inlet for water coming from condensers, or other source, of partially heated water; 9—by-pass; 10—dividing partition; 11—top of float chamber; 11'—vent for float chamber; 12—float and mechanism; 13—staggered water trays on raw water side; 14—staggered water trays on condensed water side; 15—stand pipe; 16—passages for steam in and around plate —10—; 17—valve in supply pipe:

Heretofore in most heating devices the exhaust steam from the motors or other source has been introduced into the heater in such way as to heat only the raw water which generally is at a comparatively low temperature and must be heated up to nearly the temperature of the steam—say, 210°. Owing to the impurity of this raw water, it should be filtered, and preferably chemically treated, for the purpose of precipitation and removing these impurities, all of which is old in the art therefore will not be more at length explained. My improvement while retaining all the advantages of this old system performs with it and combines with it in the same structure, an apparatus for utilizing the excess or surplus heat of the exhaust steam, for the purpose of heating the water of condensation, which may be taken from the condensers or from any other source, and which is substantially chemically and mechanically pure, and which is already at a high temperature and therefore requires comparatively little additional heat. It is, of course, an advantage to heat both these supplies and qualities of water at about the same time and by the same steam supply, and the operation of the device is as follows:

I construct the dividing partition —10— in a feed water heater in such a way as to substantially divide the same into two parts. Although this partition does not entirely cut off one part from the other, it is meant to separate the condensed water which enters at a comparatively high temperature at one side of the heater from the raw water entering at a comparatively low temperature at the other side while allowing the circulation of steam on each side. This particularly because, as has been said, the condensed water is already pure while the raw water has yet to be treated and purified. For this reason the partition has spaces about it or apertures in it through which the exhaust steam coming through —4— and —5— may pass after having warmed the water dripping from the raw water trays —13— and thereupon heats the water dripping from the condensed water trays —14— on the other side of the partition. I prefer to introduce this steam in the first place at that side of the heater to which the raw water is first introduced, since it is desirable that the coldest water should receive the first heat of the incoming steam, since the pure water from the condensers is already very hot and therefore requires a smaller increment of heat from the steam in the heater, which increment is sufficiently found in the steam after it has heated the raw water. Since the condensed water is already purified it need not be filtered and may pass directly to the outlet or pump supply —3—. On the other hand, the raw water, after having been chemically treated and heated, must yet be filtered, and in the figure the arrows show the circulation of the water up through the filter into the compartment containing the already condensed water with which it mixes, and where it is—at practically the same temperature—taken off by the pumps.

As has been pointed out, the arrangement is such that the condensed water is heated in one compartment and the makeup water in another, but before reaching the pump supply line the two waters are merged, and after merging maintain the desired working line within the float chamber.

In some cases it may be found desirable to use two floats see Fig. 4—one controlling a valve in raw water supply pipe and the other controlling a valve in the condensed water supply pipe, or either float see Fig. 3 may control both valves, and these should be controlled from the common water line level after the two supplies are combined. As usually operated, and as I have illustrated it, the float should control the operation of the valve supplying the raw water to the system, because the water from the surface condenser is in practically all cases insufficient for the requirements of the boiler feed, and consequently raw, makeup water has to be added, and it is to measure out accurately this makeup or supplementary supply that the float and valve are employed.

The water from the condenser discharge enters a stand pipe 15, thence through the water seal connection see Fig. 5 to one division of the system, while the makeup water passes through another connection to the other division. The standpipe containing the water seal through which the condensation returns pass is vented at the top to allow the escape of air which may be forced into the standpipe by reason of the pressure from the force pump.

In order to insure that there shall be sufficient quantity for the pump supply at all times, irrespective of the condition of the filter bed and in the case that the amount of pure water of condensation is not sufficient for the demand, I provide a by-pass —9— extending from the raw water side of the heater about the filter bed and discharging into the pure water side. This by-pass is adapted to operate only when the filter bed has become so clogged that not sufficient water will pass through it to supplement sufficiently the pure heated water of condensation.

I have shown the simplest form of by-passes, since the particular form is not claimed by me in this invention.

Where I have referred to the trays in each compartment as being staggered, I mean that they are alternately disposed so that the water will traverse each tray and drip to the next below. I do not wish to be limited to the particular relation of the trays one to the other as regards their slant or inclination.

I do not limit myself to any particular form, proportion, arrangement, construction, material, design or size in my invention, but What I do claim and desire to protect by Letters Patent is:

1. A heater comprising two compartments; a raw water inlet in one of said compartments; a condensed water inlet in the other of said compartments; an exhaust steam inlet in said first mentioned compartment; a plurality of trays in staggered relation to one another in said compartments arranged in series below said raw and condensed water inlets and a vertically arranged baffle plate between the two series of trays, substantially as described.

2. A heater comprising two compartments for the reception and treatment of feed water; supply pipes entering said compartments; series of trays below two of said pipes; a filter in one of said compartments, and a by-pass around said filter, substantially as described.

3. The combination of a raw water supply; a condensed water supply; and a steam supply; means intermediate said raw water and condensed water supplies for causing the steam to heat the water supplies in succession, substantially as described.

4. In a heater the combination of raw and condensed water supply inlets; a centrally and vertically arranged partition substantially the height of said heater and separating the said inlets; a plurality of trays in staggered relation to one another; and a steam inlet opening into said heater at one side of said partition, substantially as described.

5. In a heater, a partition substantially the height thereof dividing it into two compartments; a raw water inlet in one of said compartments; a condensed water inlet in the other of said compartments; a steam inlet in said first compartment; a filter; and a by-pass around said filter, substantially as described.

6. The combination of a raw water compartment; a condensed water compartment; suitable supply pipes entering said compartments; a steam supply inlet; said steam supply inlet discharging into said raw water compartment; a plurality of trays in both compartments, and a filter, substantially as described.

7. The combination of raw and condensed water inlets; a steam inlet; means intermediate the first mentioned inlets for separating the two; and a plurality of trays below said inlets, substantially as described.

8. The combination of two compartments; a series of staggered trays supported in the upper portions of said compartments; supply inlets in said compartments so positioned that the supplies from two of said inlets will be treated by the supply from the other of said inlets successively, substantially as described.

9. In a heater, the combination of a plurality of inlets; a plurality of trays arranged in series below the two of said inlets; a perforated partition separating two of said inlets; a filter below one series of said trays, and a by-pass around said filter, substantially as described.

10. A feed water heater comprising a tank or receptacle divided into two chambers, the first chamber being a raw water chamber having an inlet; the second chamber being a condensed water chamber having an inlet; a by-pass communication with said raw water chamber; a steam inlet discharging into said raw water chamber, and a water outlet, substantially as described.

11. A feed water heater comprising a tank or receptacle divided into two chambers; the first chamber being a raw water chamber; the second chamber being a condensed water chamber; means for introducing steam into both chambers successively; a plurality of staggered trays arranged in series in said chambers; a filter below one series of trays in one of said chambers, and means automatically operating to control the supply from said inlets, and an outlet, substantially as described.

12. A feed water heater having two compartments; passages communicating between the same above the water line; means for introducing raw water into one and condensed water into the other of said compartments; and means for introducing steam into said compartments successively, substantially as described.

13. The combination of a compartment for raw water; a compartment for condensed water; passages connecting the two compartments; suitable raw and condensed water supplies to respective compartments; a steam supply for successively heating the two water supplies; and a filter, substantially as described.

14. The combination of a compartment for raw water; a compartment for condensed water; passages connecting the two compartments; suitable raw and condensed water supplies to respective compartments; a steam supply; a filter; and a by-pass about the filter, substantially as described.

15. The combination of a compartment for raw water; a compartment for condensed water; passages connecting the two compartments; suitable raw and condensed water supplies to respective compartments; a steam supply; a filter; an outlet and a by-pass communicating between the raw water compartment and the outlet, substantially as described.

16. The combination of a compartment for raw water; a compartment for condensed water; passages connected the two compartments; suitable raw and condensed water supplies to respective compartments; a steam supply; a filter; and a by-pass connecting the raw water and the condensed water compartments, substantially as described.

Signed at Philadelphia in the county of Philadelphia and State of Pennsylvania this 22nd day of June 1907.

JOHN CLIFFORD JONES.

Witnesses:
MARY E. NIVEN,
MARY L. LEWIS.